April 18, 1939. M. H. WOODRUFF ET AL 2,155,177

POWER LIFT

Original Filed Sept. 18, 1935 3 Sheets-Sheet 1

Moffitt H. Woodruff
Everett W. Todd
INVENTORS

BY Victor J. Evans & Co.
ATTORNEY

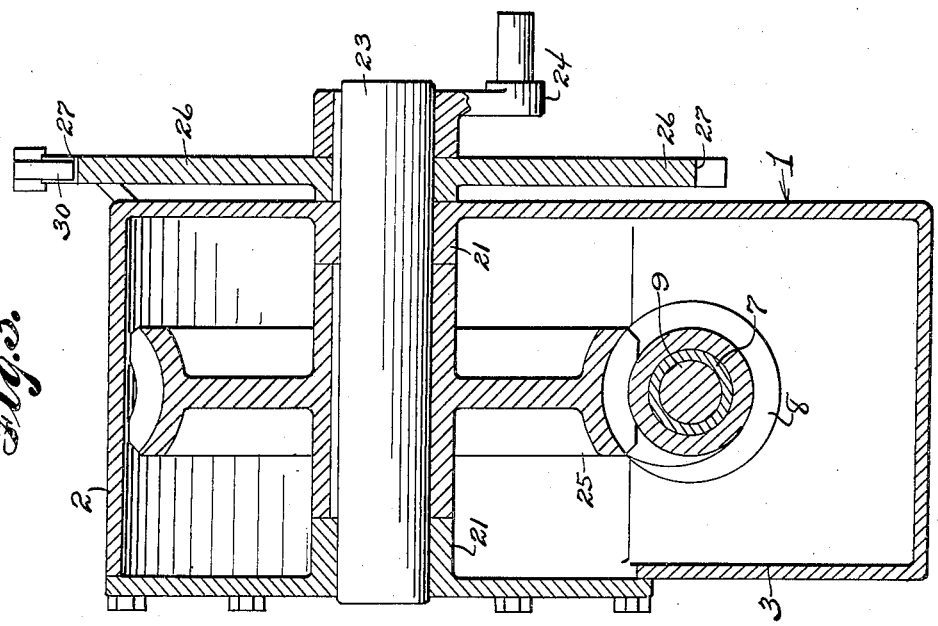

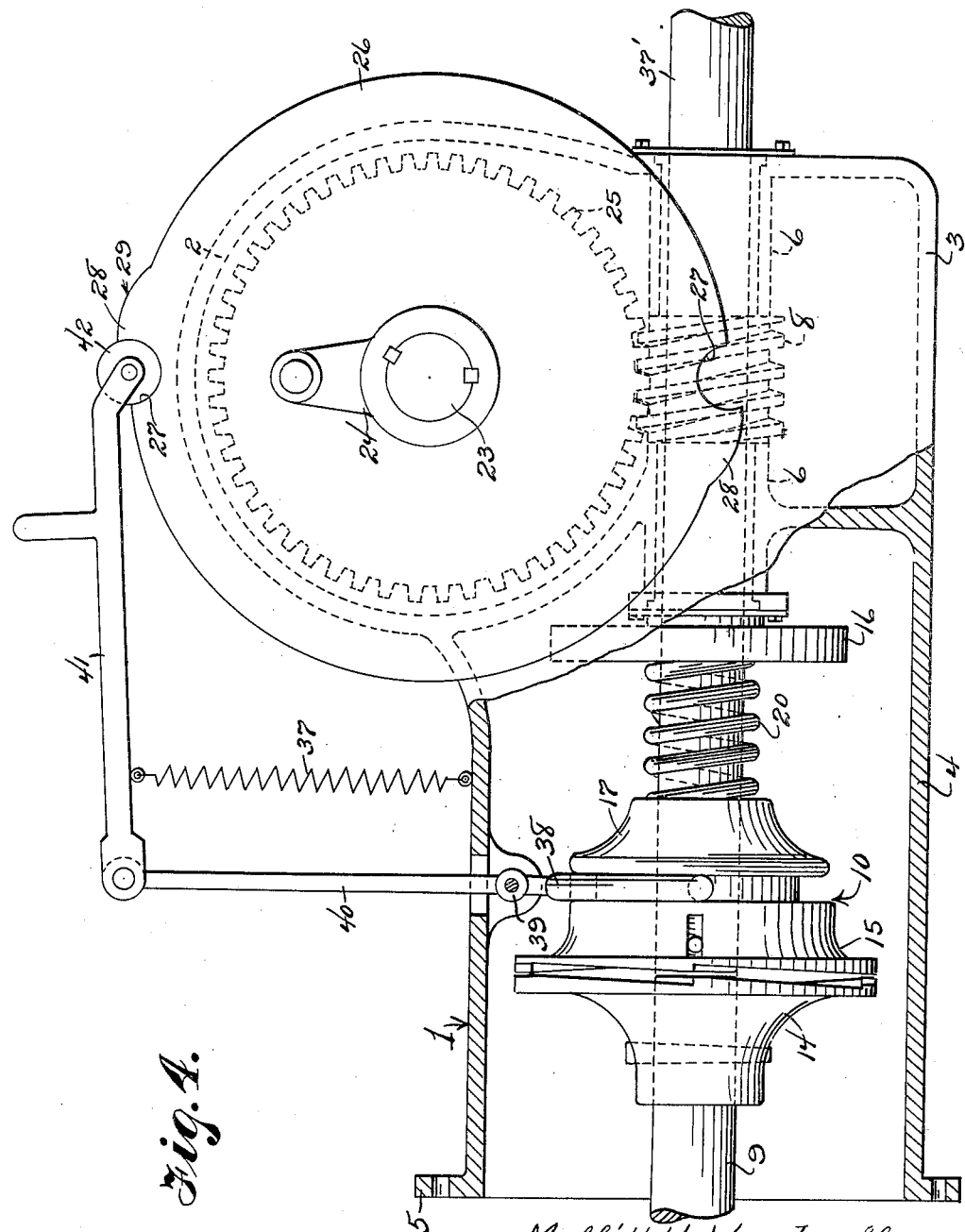

Patented Apr. 18, 1939

2,155,177

UNITED STATES PATENT OFFICE 2,155,177

POWER LIFT

Moffitt H. Woodruff, Lubbock, and Everett W. Todd, Dallas, Tex.

Application September 18, 1935, Serial No. 41,180
Renewed September 7, 1937

5 Claims. (Cl. 192—139)

This invention relates to a simple and efficient power lift consisting of a minimum number of parts and which may be manufactured and sold at a low cost and employed wherever it is desired to raise and lower a device by power and is especially adaptable to tractors and like devices. The primary object of this invention is the provision of a device of the above stated character which may be readily set in operation so that power derived from the tractor may be employed for raising or lowering farm implements connected to said tractor and which is manually set into operation and is automatically stopped when completing either its raising or lowering operations and will maintain any of its positions without employing separate locking means depending on its own drive means to remain idle under load until set in operation manually.

With these and other objects in view, this invention consists in certain novel features of construction, combination and arrangement of parts to be hereinafter more fully described and claimed.

For a complete understandng of the invention, reference is to be had to the following description and accompanying drawings, in which Figure 1 is a side elevation, partly in section, illustrating a power lift constructed in accordance with our invention.

Figure 2 is a transverse sectional view taken on the line 2—2 of Figure 1.

Figure 3 is a transverse sectional view taken on the line 3—3 of Figure 1.

Figure 4 is a side elevation, partly in section, illustrating a modified form of our invention.

Figure 1:
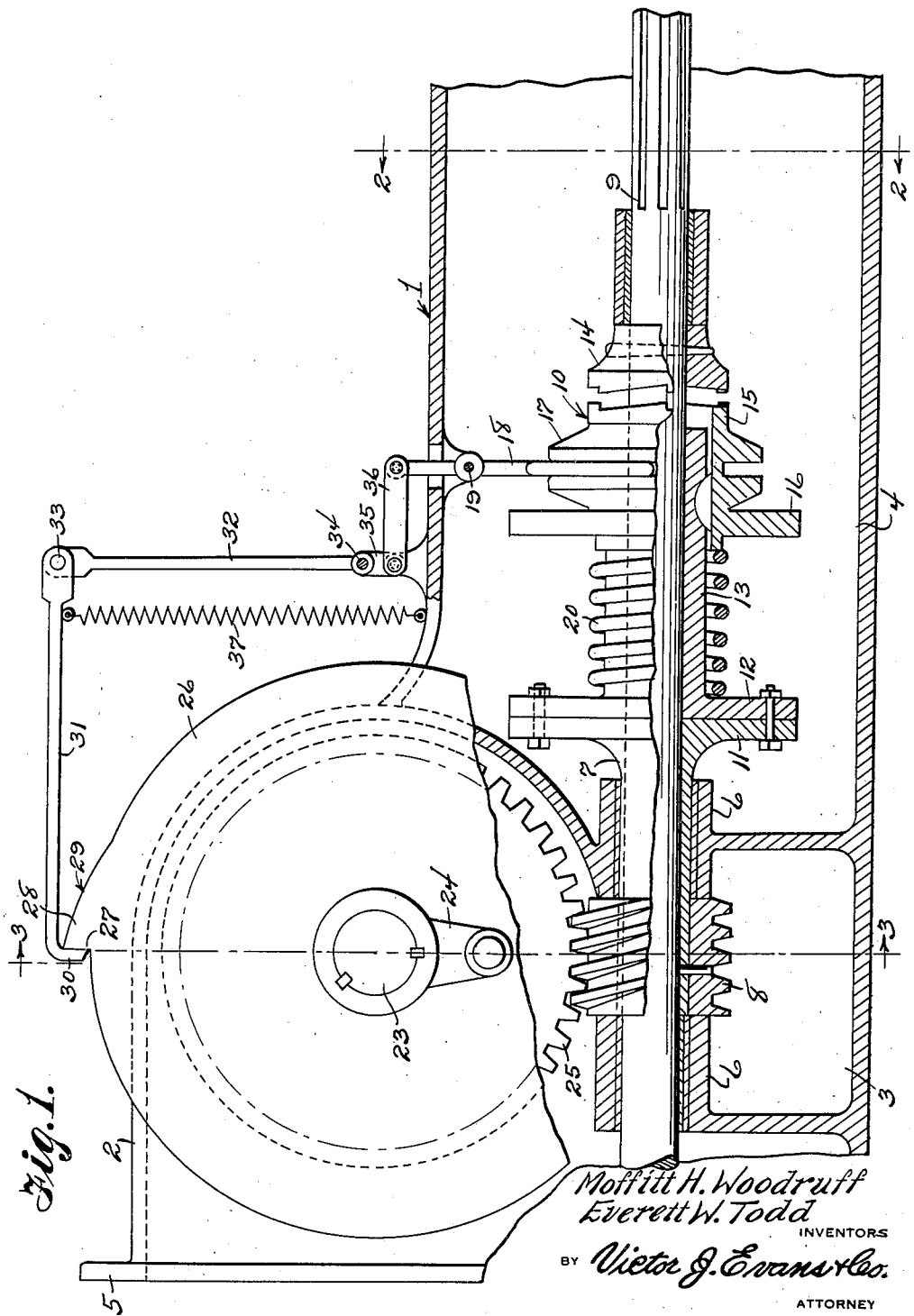

Referring in detail to the drawings, the numeral I indicates a casting including a worm gear housing 2, a worm housing 3 and a clutch housing 4. The housings of the casting are of integral construction. The casting at one end is equipped with an attaching flange 5 whereby the casting may be easily bolted or otherwise secured to a tractor or like device.

The housing 3 has aligned journals 6 which rotatably support a sleeve 7 and to which is secured a worm 8. Extending through the sleeve and free to rotate relative thereto is a power takeoff shaft 9 forming a part of a tractor or like device. The shaft and sleeve extend into the clutch housing and the shaft may project beyond the latter at one end so that another device may be connected thereto for the purpose of deriving power from the tractor.

Associated with the sleeve and shaft 9 is a clutch 10 shown to be in this instance of the jaw type. However, frictional or other types of clutches may be successfully used in connection with this invention.

The sleeve 7 at one end terminates in an attaching flange 11 to which a flange 12 of a clutch sleeve 13 is detachably secured. The clutch 10 includes clutch elements 14 and 15. The clutch element 14 is secured to the shaft 9 while the clutch element 15 is splined to the clutch sleeve 13, said clutch element 15 having formed thereto a fly wheel 16 and a clutch throwout collar 17 engaged by a fork 18 pivoted to the unit 1, as shown at 19.

A coil spring 20 is mounted on the clutch sleeve 13 between the flange 12 and the fly wheel and acts to urge the clutch element 15 into engagement with the clutch element 14. The fork 18 is for the purpose of disengaging the clutch element 15 from the clutch element 14 and will be hereinafter more fully described.

The housing 2 has journals 21 which rotatably support a shaft 23 provided at one end with a crank 24 to which may be suitably connected any device to be raised or lowered such as a farming implement attached to the tractor. Secured to the shaft 23 is a worm gear 25 meshing with the worm 8. Also secured to the shaft 23 and arranged exteriorly of the housing 2 is a control disc 26 provided with a pair of notches 27 arranged approximately 180° apart.

The notches 27 are formed by offsets 28 cast integral with the periphery of the control disc 26 and each has a face 29 which gradually merges into the periphery of the disc and a second face arranged at an arcuate angle to the periphery to be engaged by the hooked end 30 of a trip arm 31. The trip arm 31 is pivoted to a lever 32, as shown at 33. The lever 32 is pivoted to the unit 1, as shown at 34, and has on its pivoted end an extension 35. The extension 35 is connected to the upper end of the fork 18 by a link 36, the link having pivotal connection with the fork 18 and with the extension 35. A coil spring 37 is connected to the arm 31 and to the unit I for the purpose of urging the hook-shaped end 30 to ride the periphery of the control disc 26. When the hook-shaped end is in engagement with either of the notches of the control disc the clutch element 15 will be disengaged from the clutch element 14. The power from the tractor is then interrupted to the crank 24 and the latter is held against turning or rotating by the worm 8 meshing with the worm gear 25, thereby obviating any auxiliary means of locking the crank 24 in any of its positions.

In operation, to lift or to lower an implement connected to the crank 24, the control arm 31 is lifted to disengage the hook-shaped end from the notch and the spring 20 then acts to engage the clutch element 15 with the clutch element 14 establishing a driving connection between the power takeoff shaft 9 and the sleeve 7. The worm gear 8 being secured to the sleeve 7 and in mesh with the worm gear slowly rotates the shaft 23, thereby imparting motion to the crank 24. During the rotation of the shaft 23 the control disc 26 rotates therewith and as the hook-shaped end of the control 31 rides on the periphery of the disc, the hook-shaped end will under the influence of the spring 37 drop into one of the notches of said control disc, thereby causing a pull on the control arm 31 due to the turning of the disc which in turn imparts movement to the fork 18 and thus disengages the clutch element 15 from the clutch element 14, interrupting the rotation of the shaft 23 and consequently the movement of the crank 24. When the clutch element 15 is disengaged from the clutch element 14, the momentum of the flywheel 16 will cause a limited turning of the sleeve 7 sufficient to cause the control disc through the worm and worm gear and shaft 23 to turn a limited distance, bringing the teeth of the clutch element 15 fully out of engagement with the teeth of the clutch element 14.

It will be noted that the clutch 10 is located rearwardly of the worm in this form of our invention, while in the modified form of our invention shown in Figure 4, the clutch 10 is located forwardly of the worm and the clutch housing is bolted or otherwise secured to the tractors so as to receive therein the power takeoff shaft 9. In this form of our invention, the power takeoff shaft 9 has secured thereto the clutch element 14 while the clutch element 15 is splined to a stub shaft 37' journaled in the worm housing and to which the worm 8 is secured. The stub shaft 37' has the flywheel 16 secured thereto and interposed between said flywheel and the clutch element 15 is a spring 29. The clutch element 15 has the clutch collar 17 thereof connected to a fork 38 which is pivoted to the unit 1, as shown at 39. The fork 38 includes a lever 40 to which is pivoted a control arm 41. The control arm at its free end has journaled thereto a roller 42 to ride the periphery of the control disc and to move into either of the notches when in alignment therewith. The control arm 41 is connected to the unit 1 by the spring 37 acting to keep the roller in contact with the periphery of the control disc. The operation of this form of our invention is the same as heretofore described in connection with the form shown in Figures 1 to 3, inclusive.

Having described the invention, we claim:

1. A power lift comprising a housing, a sleeve journalled in the housing, a driving shaft rotatably disposed within and extending through said sleeve and adapted to be connected to a source of power supply, a clutch element within the housing fixed to said driving shaft, a second clutch element splined onto said sleeve, a spring constantly urging said second clutch element into clutching position, a clutch releasing fork pivotally carried by the housing and engageable with said second clutch element, an arm carried by said fork extending outwardly of the housing, a worm fixed to said sleeve within said housing, a worm gear meshing with said worm, a worm gear shaft extending laterally of the housing, a crank fixed to said worm gear shaft exteriorly of the housing, a notched disk fixed to said worm gear shaft between said crank and the housing, and a spring-pressed releasing member pivotally secured at one end to said arm and engaging said disk whereby to swing said fork to released position when the opposite end of said releasing member engages a notch of said disk.

2. A power lift comprising a housing, a sleeve journalled in the housing, a driving shaft rotatably disposed within and extending through said sleeve and adapted to be connected to a source of power supply, a clutch element within the housing fixed to said driving shaft, a second clutch element splined onto said sleeve, a spring constantly urging said second clutch element into clutching position, a clutch releasing fork pivotally carried by the housing and engageable with said second clutch element, an arm carried by said fork, a worm fixed to said sleeve within said housing, a worm gear meshing with said worm, a worm gear shaft extending laterally of the housing, a crank fixed to said worm gear shaft exteriorly of the housing, a notched disk fixed to said worm gear shaft, and a spring-pressed releasing member pivotally secured at one end to said arm and engaging said disk whereby to swing said fork to released position when the opposite end of said releasing member engages a notch of said disk.

3. A power lift comprising a housing, a sleeve journalled in the housing, a driving shaft rotatably disposed within and extending through said sleeve and adapted to be connected to a source of power supply, a clutch element within the housing fixed to said driving shaft, a second clutch element splined onto said sleeve, a spring constantly urging said second clutch element into clutching position, a clutch releasing fork pivotally carried by the housing and engageable with said second clutch element, an arm carried by said fork, a worm fixed to said sleeve within said housing, a worm gear meshing with said worm, a worm gear shaft extending laterally of the housing, a crank fixed to said worm gear shaft exteriorly of the housing, a notched disk fixed to said worm gear shaft, and a releasing member pivotally secured at one end to said arm and engaging said disk whereby to swing said fork to released position when the opposite end of said releasing member engages a notch of said disk.

4. A power lift comprising a housing, a sleeve journaled in the housing, a drive shaft extending through said sleeve for rotation relative thereto, a clutch mechanism within the housing to operatively connect the shaft and sleeve to rotate the latter from the former, said clutch mechanism embodying a release collar, yielding means constantly impelling the clutch mechanism into clutching position, a clutch releasing fork mounted within the housing and operatively connected with the release collar, a worm secured to said sleeve, a worm gear meshing with said worm, a shaft disposed laterally of the housing and having the worm gear secured thereto, a disk fixed to said laterally extending shaft, and a releasing member secured to said releasing fork and having a sliding contact with said disk, the disk being provided with spaced seats in which the releasing member may engage to declutch the clutching mechanism, the yielding means effecting clutching position of said clutching mechanism except when the releasing member is engaged in a seat.

5. A power lift comprising a housing, a drive shaft extending longitudinally of the housing, a worm rotatably surrounding said shaft, a clutch mechanism within the housing to operatively connect the shaft to the worm, yielding means constantly impelling the clutch mechanism into clutching position, a clutch releasing fork mounted within the housing and operatively connected to the clutch mechanism, a worm gear meshing with said worm, a shaft disposed laterally of the housing and having the worm gear secured thereto, camming means fixed to said laterally extending shaft, and a releasing member secured to said releasing fork and contactable with the camming means, said camming means being provided with spaced surfaces with which the releasing member may engage to declutch the clutching mechanism, the yielding means effecting clutching position of the clutching mechanism except when the releasing member is engaged by one of said surfaces.

EVERETT W. TODD.
MOFFITT H. WOODRUFF.